United States Patent [19]

McClure et al.

[11] Patent Number: 5,198,743

[45] Date of Patent: Mar. 30, 1993

[54] BATTERY CHARGER WITH MICROPROCESSOR CONTROL

[75] Inventors: Malcolm S. McClure; Phong B. Chau, both of Indianapolis, Ind.

[73] Assignee: Span, Inc., Indianapolis, Ind.

[21] Appl. No.: 625,346

[22] Filed: Dec. 11, 1990

[51] Int. Cl.$^5$ .............................................. H02J 7/04
[52] U.S. Cl. ..................................... 320/31; 320/21; 320/36; 320/40
[58] Field of Search ....................... 320/20, 21, 22, 23, 320/31, 32, 35, 36, 37, 38, 39, 40

[56]  References Cited

U.S. PATENT DOCUMENTS

| | | | |
|---|---|---|---|
| 3,732,481 | 5/1973 | Mas | 320/14 |
| 4,006,397 | 2/1977 | Catotti et al. | 320/31 |
| 4,246,529 | 1/1981 | Jurgens et al. | 320/39 |
| 4,388,582 | 6/1983 | Saar et al. | 320/39 X |
| 4,621,225 | 11/1986 | Birk | 320/21 |
| 4,639,655 | 1/1987 | Westhaver et al. | 320/14 |
| 4,673,862 | 6/1987 | Wahlstrom | 320/23 |
| 4,727,306 | 2/1988 | Misak et al. | 320/35 |
| 4,774,449 | 9/1988 | Elkins | 320/21 |
| 4,779,035 | 10/1988 | Engelmann | 320/39 |
| 4,806,840 | 2/1989 | Alexander et al. | 320/20 |
| 4,855,663 | 8/1989 | Matsui et al. | 320/20 |

Primary Examiner—Steven L. Stephan
Assistant Examiner—Kristine Peckman
Attorney, Agent, or Firm—Van Metre Lund

[57] ABSTRACT

A battery charger has battery terminals connected to a conventional wall outlet through a switching power supply to provide a direct conductive non-isolated path from the supply for direct transformer-less supply of charging current to a battery. Pulse width modulated signals are applied to a MOSFET of the power supply from an output port of a microprocessor which is operates a ramp generator and responds to a comparator circuit coupled to a battery voltage sense circuit and the ramp generator. The microprocessor is programmed to accurately control generation of the pulse width modulated signals, to shut off current when a true voltage peak is reached at a full charge condition, to avoid response to false peaks, to cut off current for short time intervals during voltage measurements, to perform an exponential averaging function and to shut down at excessive battery temperatures or time rates of change of battery temperature.

27 Claims, 7 Drawing Sheets

BATTERY CHARGER WITH MICROPROCESSOR CONTROL

BACKGROUND OF THE INVENTION

1. Field of the Invention

This invention relates to a battery charger with microprocessor control and more particularly to a battery charger having voltage measurement circuitry which is quite simple and inexpensive but which is highly accurate, stable and reliable and having current supply and control features which minimize cost of manufacture but which facilitate supply of high currents for rapid charging and which insure reaching a full charge condition without overcharging.

2. Background of the Prior Art

The Baker et al. U.S. Pat. No. 4,746,854 4,918,368 contain reviews and citations of the prior art and disclose battery chargers in which a microprocessor is used for control of a number of operations including the control of application of a charging current through a current regulator in series with the battery while monitoring the voltage at the battery terminals and exercising control of the time of termination of charging of the battery. Other operations include controls to effect a discharge operation, an autocycle mode of operation in which a charge operation is effected after a discharge operation and monitoring and determination of battery capacity and efficiency. Such battery chargers are very efficient and highly reliable but still leave something to be desired, particularly with regard to costs of manufacture.

SUMMARY OF THE INVENTION

This invention was evolved with the general object of providing battery chargers which are less expensive to manufacture while being highly accurate, reliable and efficient and otherwise having high performance characteristics.

Important aspects of the invention relate to the recognition and discovery of problems with prior art arrangements and their causes and to an analysis of what is necessary to overcome such problems and otherwise provide improved battery chargers. These have resulted in a battery charger in which charging current is supplied through a switching power supply which is directly connected to a standard AC supply such as a conventional 120 volt 60 Hz supply as used in the United States. The power supply is operated from pulse width modulated signals supplied directly from the same controller as used to perform other functions, simplifying construction and operation and minimizing cost of manufacture while providing a charger which is safe, reliable and versatile in operation. A microprocessor and associated simple and inexpensive circuitry are used as the controller in illustrated embodiments, but it will be understood that other equivalent forms of logic systems may be used and that the terms "microprocessor" and "processor" are used herein in a generic sense to include such equivalent forms. Variables including battery current, battery voltage and temperature are readily and accurately measured without requiring complicated and expensive circuitry and provisions are made for obviating adverse effects of noise, false voltage peaks and variations in contact resistance to obtain highly reliable and accurate operation.

Important features of the invention relate to voltage measurement. In analyzing the construction and operation of prior chargers, it is found that a substantial cost factor relates to the provision of circuitry for determination of the voltage at the battery terminals. It is also found that there are minor but nevertheless significant problems with regard to the reliability and accuracy of measurement with prior systems, it being important that the voltage be determined reliably and with a high degree of accuracy, in order to make sure that charging is stopped before a potentially dangerous overcharge condition is reached while at the same time achieving a full charge of the battery.

In accordance with the invention, the battery voltage is measured using a voltage comparator which compares a voltage which is proportional to the battery voltage with a ramp voltage varied from a certain initial value as a certain function of time, being preferably generated by holding a capacitor at a certain level of charge and then releasing the capacitor to allow its charge to change at a certain rate. A microprocessor initiates the ramp voltage generation and measures the elapsed time upon receipt of a signal from the voltage comparator, to determine the magnitude of the battery voltage.

This voltage measuring arrangement is extremely simple and low in cost but is found to be capable of producing very high resolution over a very wide range of battery voltage, it being possible to obtain resolutions better than half a millivolt over a battery voltage range of 1 to 20 volts. It is also found that what might appear to be deficiencies, such as non-linearities and limitations with respect to absolute accuracy, are not significant when the arrangement is used in peak detection in a battery charger environment.

Additional features of the voltage measurement arrangement relate to the inclusion of an additional comparator which compares a supply voltage, either unregulated or regulated with a ramp voltage which may preferably be the same ramp voltage as applied to the first comparator. With these features, improved accuracy and reliability are obtained, more than compensating for the small additional cost of circuitry particularly in that the need for a crystal/resonator controlled oscillator may be eliminated and a less expensive processor may be used as well.

Further important features of the voltage measurement arrangement relate to the use of an exponential averaging operation by the microprocessor to eliminate or minimize the effects of terminal voltage noise and to the cutting off of battery current during at the time of measurement, to avoid adverse effects of variations in contact resistance at the battery terminals which may be produced during slight jostling of the battery, for example. The problems solved by these features appear to have gone unrecognized in the prior art.

Another problem which has not been recognized and dealt with is a problem with early false peaking of battery voltage, which is found to occur with certain types of batteries and/or in certain operating conditions and which has led to premature discontinuance of charging, long before the battery has reached a full charge condition. It has been discovered that this problem can be substantially obviated through the use of a special slope analysis technique by the microprocessor. Voltage readings are analyzed for concavity of the profile. The profile is concave upward if a false peak is indicated and concave downward in the case of a real peak.

Still further features of the invention relate to the use of a microprocessor to implement all the functions of a pulse width modulator in addition to its other functions, producing a charger combination which is referred to herein as a "microswitcher" and which has a number of important advantages. Among other things, it makes it possible to take direct wall power and charge any size nicad battery pack, without using any expensive and heavy power transformer in the charge current path. In one illustrated embodiment, only a small and inexpensive transformer is provided in forming low current, low voltage supplies for the charger electronics only. In another illustrated embodiment, such low current, low voltage supplies are coupled directly to the AC source, no transformer being required. Important features of the microswitcher operation include program counter approach in which the values are entered into the program counter of the microprocessor in a manner such as to control the duty cycle of operation of a power switch transistor in small steps to obtain increased accuracy of control of charging current.

These and other objects, features and advantages contemplated by the invention will become more fully apparent from the following detailed description taken in conjunction with the accompanying drawings.

DESCRIPTION OF PREFERRED EMBODIMENTS

Figure 1:
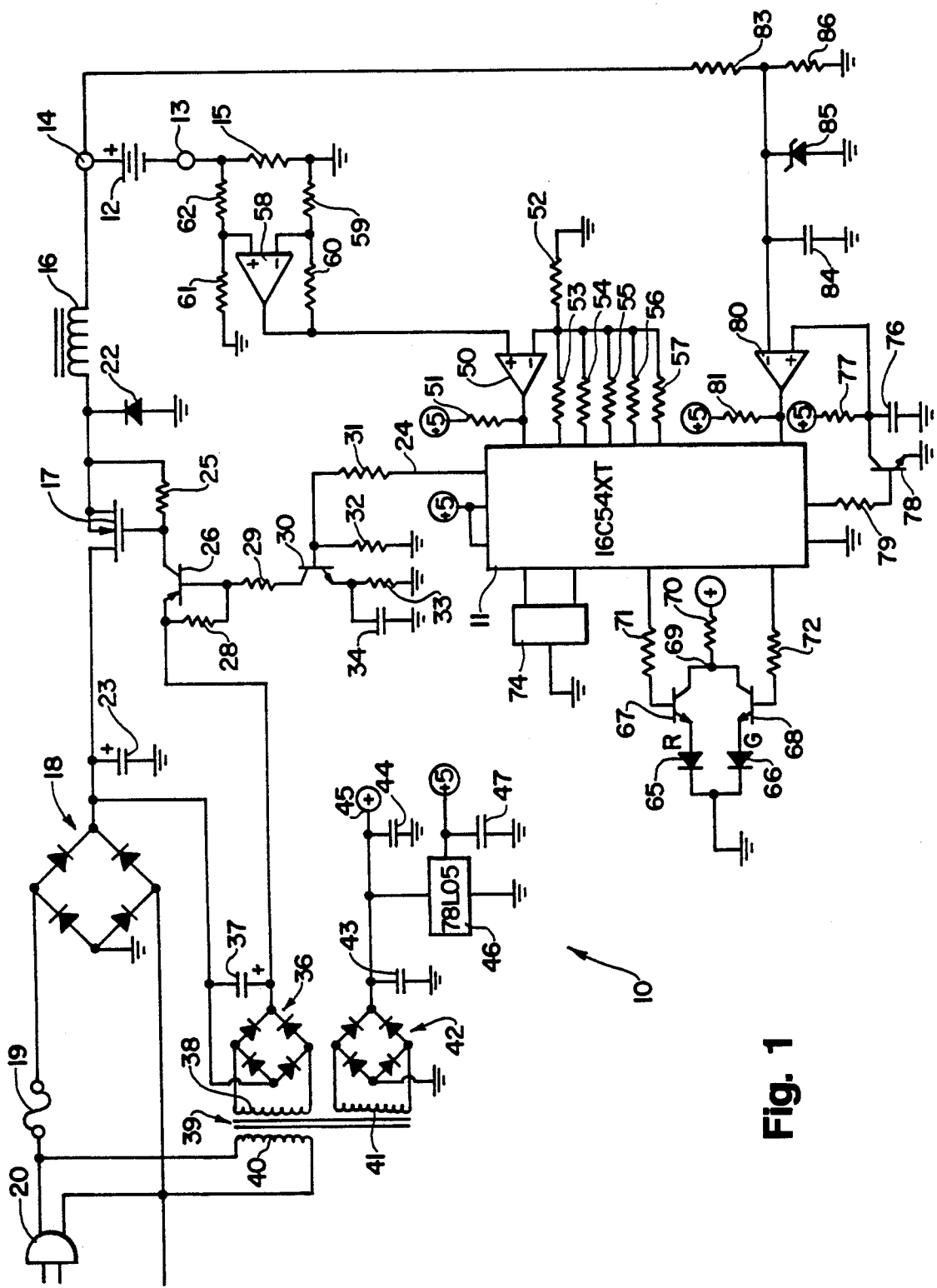
FIG. 1 is a schematic diagram of one form of battery charger controlled by a microprocessor and constructed in accordance with the invention and including a basic voltage measurement arrangement of the invention.

Reference numeral 10 generally designates a battery charger which is constructed in accordance with the principles of this invention and which includes a microprocessor 11 for control thereof. Negative and positive terminals of a battery 12 to be charged are connected to terminals 13 and 14, terminal 13 being connected through a current sense resistor 15 to circuit ground. In accordance with important features of the invention, terminal 14 is connected through an inductor 16 and a variable duty cycle power switch transistor 17 to the output of a bridge rectifier 18 which has an input connected through a fuse 19 to a conventional plug 20 to be supplied with 120 volt, 60 Hz current, for example. A diode 22 is connected between ground and the junction between inductor 16 and transistor 17, to conduct current through inductor 16 when transistor 17 is non-conducting.

A filter capacitor 23 is connected to the output of the bridge rectifier 18 and may preferably have an unusually small value, 10 microfarads for example, to perform electrical noise filtering. With control features as hereinafter described, the power switch transistor 17 is so controlled as to obtain constant charging current, without requiring a constant DC voltage at the output of the bridge rectifier 18.

The power switch transistor 17 is preferably a MOSFET transistor and is controlled from a pulse width modulated signal to control the charging current applied to the battery 12. In accordance with the invention, an output pin of the microprocessor 11 is coupled through a line 24 and drive circuitry to directly control the power switch transistor 17, the need for conventional pulse width modulator circuitry being obviated.

Drive circuitry provides proper gate drive for the power switch transistor 17 by appropriate translating of the signal which is applied from the microprocessor through line 24. The gate electrode of power switch transistor 17 is connected through a resistor 25 to its source electrode and is connected directly to the collector of a switching transistor 26 the gate of which is connected through a resistor 28 to its emitter and through a resistor 29 the collector of a control transistor 30 which is operated in a constant current configuration. The base of transistor 30 is connected through a resistor 31 to the line 24 and through a resistor 32 to ground. The emitter of transistor 26 is connected to ground through a resistor 33 and a parallel capacitor 34. When the line 24 is high, the transistor 30 conducts a substantially constant current to cause transistor 26 to conduct and apply a substantially constant voltage to the gate of power switch transistor 17 and turn power switch transistor 17 on. When line 24 is brought low, transistors 35 and 26 are turned off, thereby terminating current flow through the transistor 17.

In accordance with a specific feature of the invention, the power switch transistor 17 may be an n-channel enhancement-mode type of MOSFET which is readily available and relatively inexpensive but which, it is found, requires a gate signal at a level higher than the voltage at its source electrode to insure that it will turn on in the circuit configuration as shown. To insure proper and reliable operation, an auxiliary supply is provided which may supply a 9 volt DC voltage, for example, and which includes a bridge rectifier circuit 36 having an output connected to a filter capacitor 37 and having an input connected to a secondary winding 38 of a small conventional transformer 39 which has a primary winding 40 connected to the plug 20. The negative output terminal of the rectifier 36 is connected to the positive output terminal of the bridge rectifier 18 while the positive output terminal of the rectifier 36 is connected to the emitter of the switching transistor 26. When transistor 26 conducts, a potential is applied to the gate of the power switch transistor 17 which is substantially more positive than the potential at the output of rectifier 18, thereby insuring that the MOSFET power switch transistor 17 is turned off.

To supply an operating voltage for the microprocessor and other components, the transformer 39 has a second secondary winding 41 connected to the input of a bridge rectifier 42 which has its output connected to filter capacitors 43 and 44, to an unregulated voltage output terminal 45 and to the input of a voltage regulator 46 which has its output connected to a filter capacitor 47 and to an output terminal 48 from which a regulated supply voltage of plus 5 volts, for example, is applied to circuit points as indicated.

Current sensing circuitry is provided including a comparator 50 having an output connected to an input port of the microprocessor 11 and through a resistor 51 to the plug 5 volt supply. A minus input terminal of the comparator 50 is connected through a resistor 52 to ground and to output ports of the microprocessor 11 through resistors 53, 54, 55, 56 ad 57 which may have values of 1K, 2K, 4K, 8K and 16K, for example, voltages being developed at selected output ports to develop a desired reference voltage at the minus input terminal of the comparator 50. The plus input terminal of the comparator 50 is connected to the output of an operational amplifier 58 which has a minus input connected through a resistor 59 to ground and through a resistor 60 to its output terminal. The plus input of amplifier 58 is connected to through a resistor 61 to ground and through a resistor 62 to the battery terminal 13, a voltage being applied to the input of amplifier 58 which is a function of the voltage across the current sensing resistor 15 and thereby the charging current of the battery. The microprocessor is programmed to determine the battery current through control of the voltages applied to the resistors 53–57 and by sensing the output of the comparator 50.

A pair of LED's 65 and 66 are provided for indicating purposes, connected through transistors 67 and 68 to a circuit point 69 which is connected through a resistor 70 to the unregulated voltage supply terminal, bases of the transistors being connected through resistors 71 and 72 to output ports of the microprocessor 11 to control energization of the LED's 65 and 66. To develop a clock signal for control of the microprocessor 11, terminals thereof are connected to a crystal/resonator 74 which may operate at 4 MHz, for example.

Further important features of the invention relate to the provision of voltage measurement circuitry which is usable to determine the battery voltage with a high degree of accuracy while being relatively simple in construction and operation, using inexpensive components. A ramp generator is formed by a capacitor 76 connected to ground and through a resistor 77 to the regulated plus 5 volt supply, with a clamping transistor 78 being connected across the capacitor 76 and an output port or pin of the microprocessor 11 which is shifted form a high condition to a low condition at the start of a measurement operation. Transistor 78 then ceases conduction to allow the capacitor 76 to charge through the resistor 77 and to develop a ramp voltage at its ungrounded terminal. The ramp voltage so developed is applied to the plus input of a comparator 80 the output of which is connected through a resistor 81 to the plus 5 volt regulated supply voltage and directly to an input port of the microprocessor 11. The minus input of the comparator 80 is connected to the battery terminal 14 through a resistor 83 and to ground through a capacitor 84, a voltage limiting zener diode 85 and a resistor 86.

In operation, the microprocessor normally sits with its output pin connected to resistor 79 in a high state, thereby saturating the transistor 78 and holding the voltage across capacitor 76 near zero. To make a reading, the microprocessor takes the output pin low. This allows the capacitor voltage to ramp upward. When the comparator 80 sees a coincidence between the ramp voltage and the divided down voltage from the battery, it sends a high signal back to the microprocessor 11. The microprocessor 11 measures the time between its releasing of the ramp and the return signal from the comparator and uses this number as a measure of battery voltage.

The salient features of this voltage measuring arrangement are that it is extremely simple and low cost but produces very high resolution over a very wide range of battery voltage. Typically, it is possible to obtain resolutions better than half a millivolt over a battery voltage range of 1 to 20 volts. Further, these results are accomplished with low tolerance parts. It is also found that non-linearities and limitations with respect to absolute accuracy are not significant in the peak detection usage of the circuit as illustrated.

Figure 2:
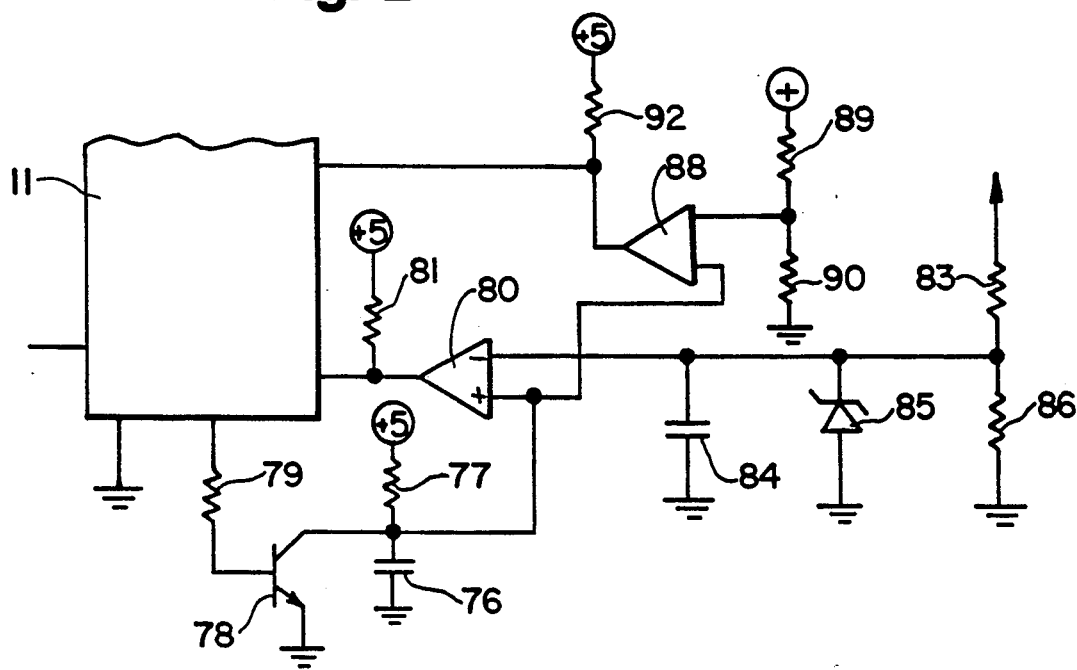
FIG. 2 is a schematic diagram illustrating an improvement of the basic voltage measurement arrangement shown in FIG. 1.

The basic voltage measuring circuit shown in FIG. 1 may be embellished in a number of ways. FIG. 2 shows the addition of a second comparator 88 to measure the unregulated supply voltage which is applied to the minus input of comparator 88 through a voltage divider formed by resistors 89 and 90, the output of comparator 88 being connected to an input port of the microprocessor 11 and through a resistor 92 to the 5 volt regulated voltage source. With this configuration, the microprocessor 11 is so programmed that a single firing of the ramp produces both a reading of battery voltage and supply voltage. The microprocessor 11 then uses the difference in readings to verify battery presence, and/or to compensate for perturbations in the supply voltage.

The capacitor 84 is optional but is desirable for noisy environments or in situations where excessive 60 Hz appears on the supply.

Figure 3:
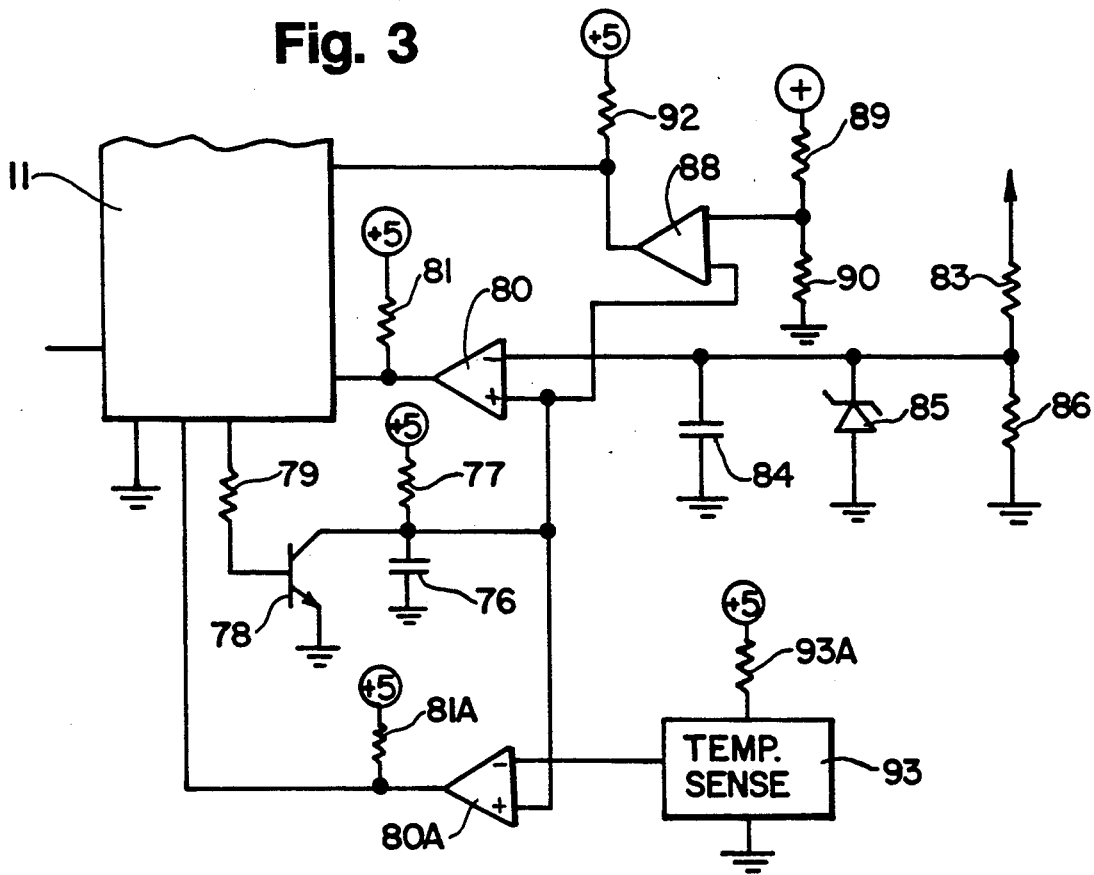
FIG. 3 is a schematic diagram similar to FIG. 2, illustrating a further improvement of the basic voltage measurement arrangement.

FIG. 3 illustrates two further modifications. The second comparator 88, rather than monitoring an unregulated supply as in FIG. 1, monitors the regulated 5 volt supply. Since this supply is produced by the regulator 46 and is quite stable, any change in this reading actually reflects a change in microprocessor clock frequency. Again, this information can be used to compensate the battery voltage readings. This approach may eliminate the need for a crystal or other expensive form of resonator for control of oscillator frequency and may allow use of a less expensive microprocessor as well.

FIG. 3 also illustrates application of the ramp voltage and a voltage from a temperature sensing element 93 to the plus and minus inputs of a comparator 80A which has an output connected to an input port of the microprocessor 11 and through a resistor 81A to the plus 5 volt supply. The microprocessor is programmed to discontinue charging in response to either an excessive value or an excessive time rate of change of value of a voltage developed by a temperature sensing element 93 which is located in proximity to a battery, the value being measured from the count required to produce an output from the comparator 80A. Element 93 may be of a type requiring a supply voltage and is shown connected through a resistor 93A to the plus 5 volt supply.

Further important features of the invention relate to the manner in which the microprocessor 11 is programmed to operate to achieve better performance and more reliable operation, while minimizing the number of required components and otherwise reducing the cost of manufacture of the charger. These features have been developed as a result of the discovery and recognition with problems with the prior art systems and after analysis of charger operations.

Figure 4:
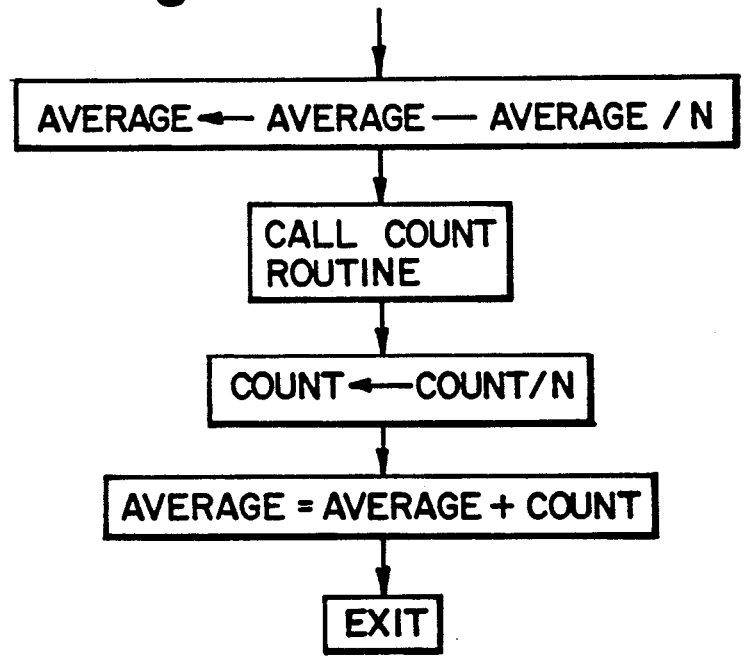
FIG. 4 is a flow diagram illustrating an exponential averaging operation of the microprocessor of the charger of FIG. 1.
Figure 7A:
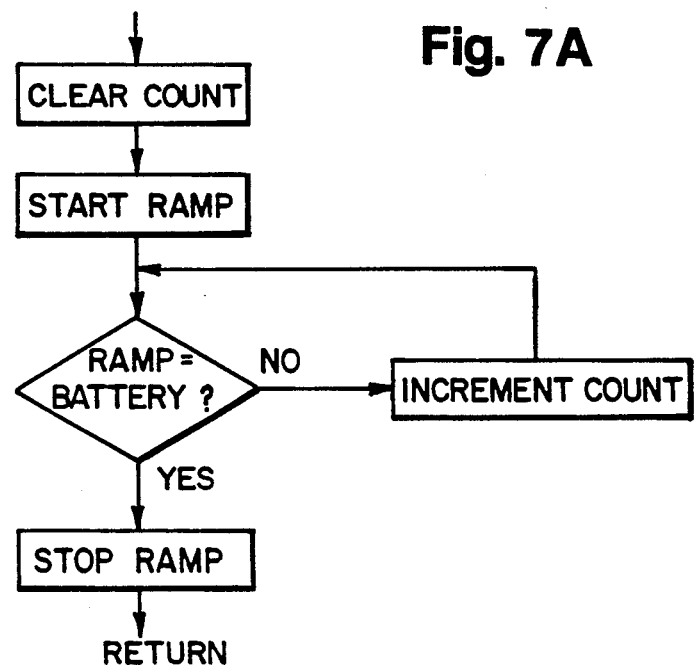
FIG. 7A is a flow diagram of a basic count routine usable for measuring a voltage with a ramp generator arrangement of the invention.
Figure 8:
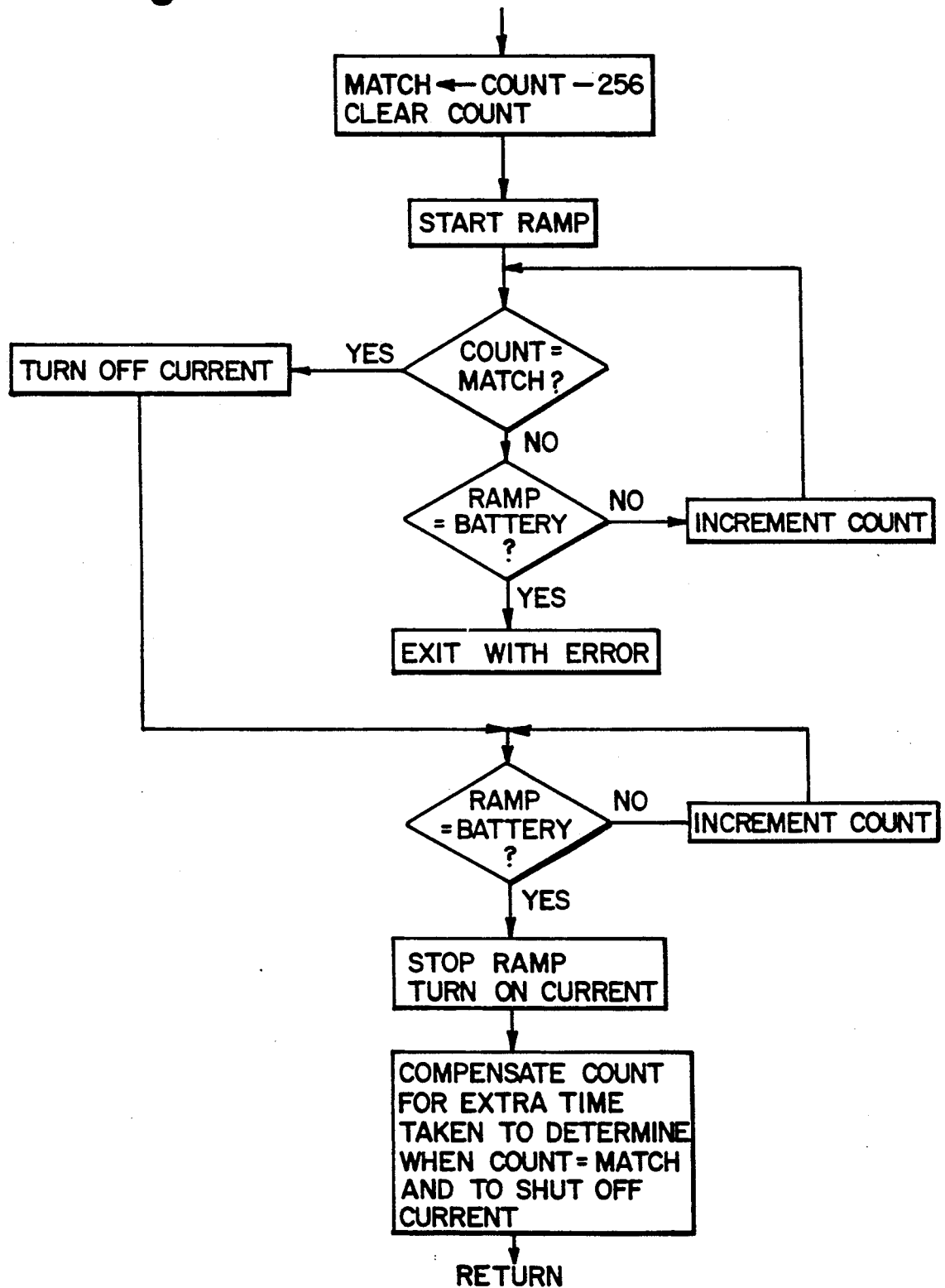
FIG. 8 is a flow diagram illustrating an operation of the microprocessor of the charger of FIG. 1 to obtain the operations depicted in FIG. 7.

It is found that nicad batteries often produce many millivolts of terminal voltage noise, especially when charged at high rates and, in accordance with the invention, the microprocessor 11 is programmed to utilize a smoothing technique in filtering of voltage readings and avoiding the adverse effects of noise. In particular, a form of exponential averaging is used which has the important advantage of requiring much less RAM space than would be required by a running average approach, for example. In exponential averaging a fraction of the old average is removed from the "running" value and replaced with a fraction of the present reading. Note that a long list of previous readings does not need to be maintained as it would with a true running average. FIG. 4 is a flow diagram illustrating exponential averaging operations of the microprocessor 11. The value "N" is the number of readings being taken; FIGS. 7A and 8 provide examples of the count routine which is called in FIG. 4.

Figure 5:
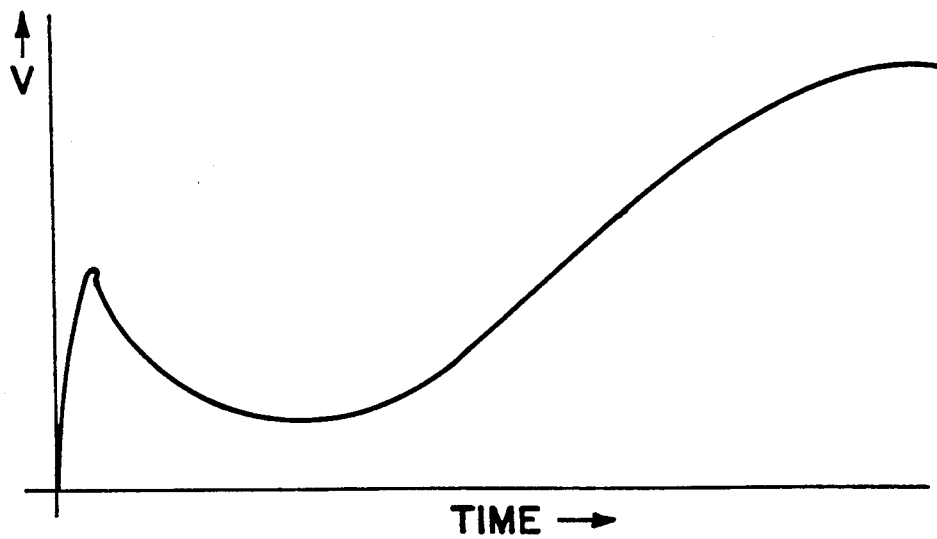
FIG. 5 graphically illustrates the voltage profile in a typical occurrence of a false peak.

It has also been found that often, when a nicad battery is placed under fast charge, the terminal voltage will quickly rise to a peak and then fall away for several minutes before commencing a normal charge profile. FIG. 5 graphically illustrates a typical false peak which is indicated by reference numeral 94 and which occurs long before the normal peak as indicated by reference numeral 95, which occurs at or near the full charge condition of the battery. Such false peaking typically occurs when a battery has been deeply discharged or has never been previously charged. With certain types of cells, false peaks may be observed under almost all conditions.

The height and time duration of false peaks are such that they will usually shut off a peak detecting charger unless some provision is made to prevent it. In accordance with the invention, a slope analysis technique is employed that reliably eliminates the problem. In particular, the voltage readings after a peak are analyzed for concavity. It has been found that when a false peak occurs, the profile rises very rapidly to the false peak which is immediately followed by a slope which is concave upward, whereas the profile is concave downward following a real peak as well as being concave downward in approaching the real peak. If the profile is concave upward, it is assumed to be a false peak. If the profile is concave downward, it is assumed to be a real peak.

Figure 6:
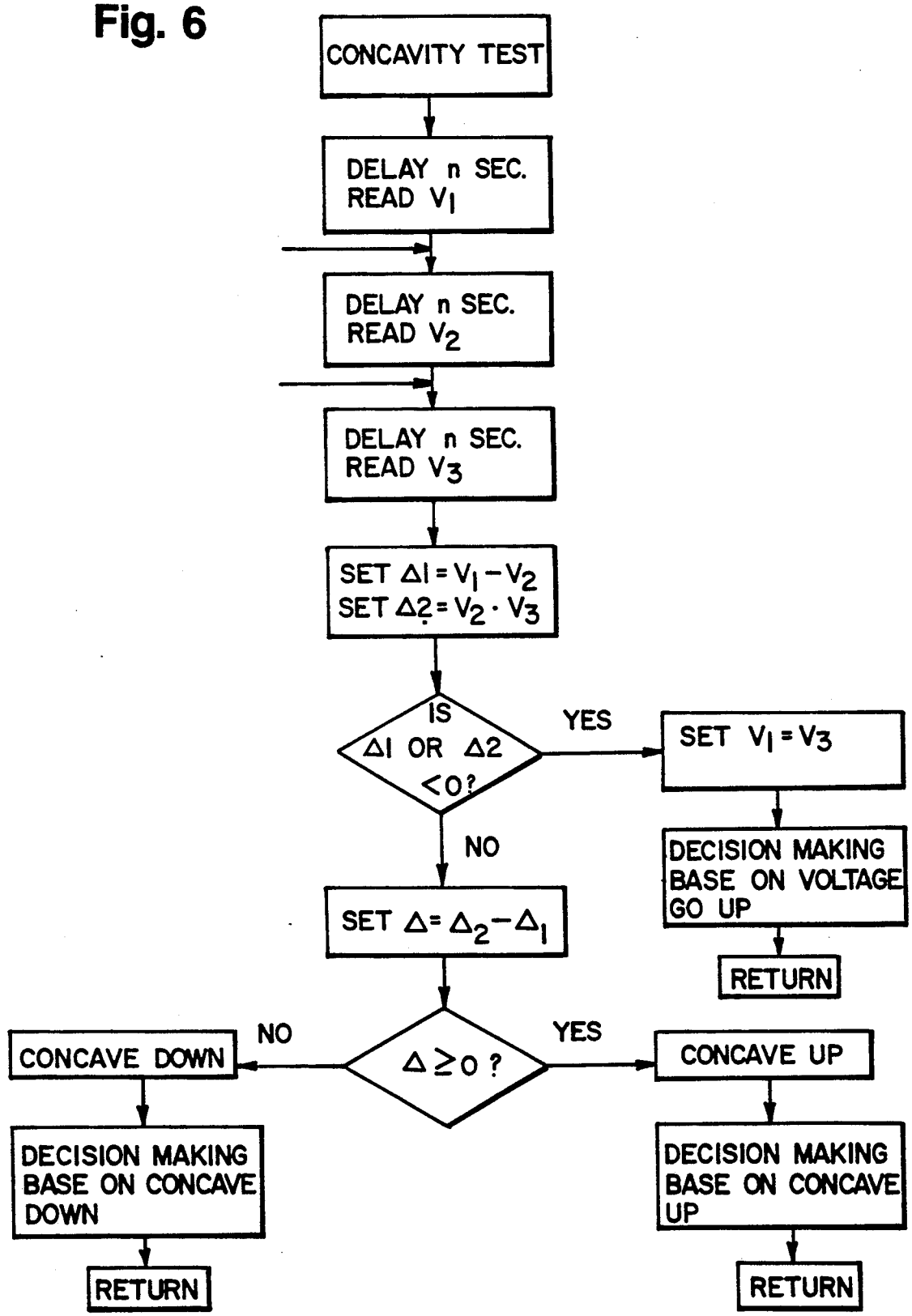
FIG. 6 is a flow diagram illustrating an false peak detecting operation of the microprocessor of the charger of FIG. 1.

FIG. 6 is a flow diagram illustrating the false peak detecting operation of the microprocessor 11. This operation is performed as part of an operation to stop application of a charging current at the full charge condition, the overall operation being performed as disclosed in the aforementioned Baker et al. U.S. Pat. No. 4,746,854, the disclosure of which is incorporated by reference. As disclosed, in that patent, discontinuance of charging is based upon a decision as to whether the voltage has decreased from a prior peak value by an difference value which is greater than a certain threshold value. With the operation depicted in FIG. 6, such a decision-making process is modified by measuring concavity and its direction. It is noted that three delay steps are shown, prior to reading of V1, V2 and V3, respectively, and that there are three entry points. The delay prior to read of V1 is entered in the initial sequence. An entry to perform the delay prior to reading of V2 is made after setting V1 equal to V3 as shown in the right-hand portion of the diagram. An entry to perform the delay prior to reading of V3 is made after either of the steps in the lower portion of the diagram to base decision making on either concave up or concave down, V1 being set equal to V2 and V2 being set equal to V3 as part of each of such steps.

Battery terminal contacts have been discovered to be another source of problems. In many situations where the battery to be charged is connected to the charger by spring loaded contacts, it is found that there will typically be around 100 mV of drop across each contact under fast charge conditions. A slight jostling of the battery can result large changes in these contact voltages, and these changes are indistinguishable from actual changes in battery voltage.

To circumvent this problem, the charger of the invention shuts off the charge current as the voltage is being read. (By Ohm's Law, the contact drop goes to zero as the current through them goes to zero.) This technique offers two further advantages. First, errors due to ripple on the power supply are eliminated, and secondly, some forms of false peaking also disappear.

Shutting off of current was initially tried with a routine as shown in FIG. 7A, performed in repetitive cycles to increment a "COUNT" value in a register until the ramp and battery voltage values are equal, the COUNT value being then a measure of the battery voltage. When using this routine, it was discovered that the technique of shutting off current during the entire time that the routine was performed could create a serious adverse increase in the charge time. Typically a voltage reading takes about 100 mS. If a data rate of 3 to 4 readings/second were maintained, the current would be off for about one third of each second.

Figure 7B:
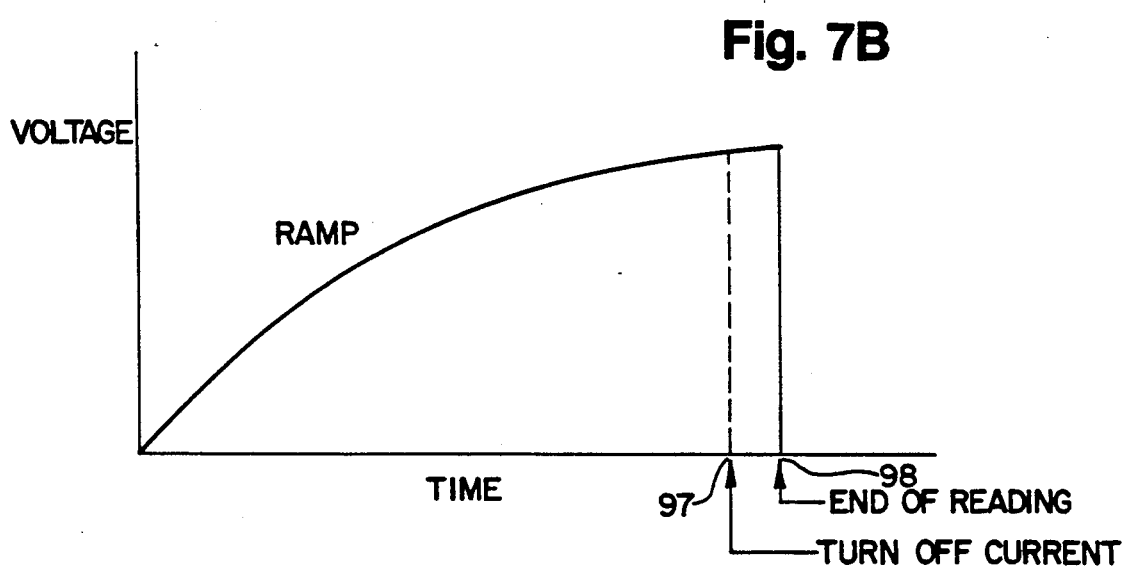
FIG. 7B graphically illustrates the timing of current shut and reading operations in accordance with the invention.

This problem has been overcome by anticipating the length of each reading and waiting to shut off the current until a few milliseconds before actual coincidence occurred at the comparator. FIG. 7B graphically illustrates this feature, the current being cut off at a time indicated by reference numeral 97, shortly before the end of the reading, indicated by reference numeral 98. The result of this feature is that all of the advantages of current switching are achieved with only a small increase in charge time which may be on the order of 3% or less.

FIG. 8 is a flow diagram which illustrates an operation of the microprocessor 11 to obtain the operations depicted in FIG. 7B. The value "MATCH", which may initially be set at zero, is set equal to the COUNT value minus a certain fixed value which is so set as to insure shut off of current in advance a reading operation, being set at 256 in the illustrated operation. If the battery voltage reaches the ramp voltage prior to the time that the COUNT value reaches the MATCH value, an error condition exists and the operation is exited. Normally, the COUNT value is incremented until it equals the MATCH value set during the previous ramp operation. Then, the current is shut off and thereafter the COUNT value is incremented until the battery voltage equals the ramp voltage at which time the current is turned on. The operation is then repeated after compensating COUNT for the extra processor cycles taken to for the comparison and turn-off steps, both of which are exactly determinable.

Important features of the invention relate to the use of the microprocessor 11 to implement all the functions of a pulse width modulator in addition to its other functions, producing a charger combination which, as aforementioned, is referred to herein as a "microswitcher". In the microswitcher configuration, an output pin from the processor directly controls the power switch transistor 17 through the transistors 26 and 30 to control charging current which passes through the power switch transistor 17 into the standard diode/inductor arrangement as shown and into the battery. The magnitude of the current is sensed between the negative battery terminal and ground, across the current sense resistor 15. The current magnitude is compared with a reference value (which can be set by the processor through control of the output ports connected to resistors 53-57) and a "too high/too low" indication is sent back to the processor by the comparator 50. In operation, the processor continuously adjusts the duty cycle of the switch to keep the charge current as close to the set point as possible.

When the microprocessor is used in this way to directly control the power switch transistor 17, improved results are obtained through the use of certain specially programmed operations. Since the microprocessor 11 can only control the power switch in discrete time steps, it is important that the true instruction cycle speed be as high as possible. A MicroChip 16C54 processor running with a 4 MHz clock has been used to give an instruction cycle time of 1 uS. A processor of this type is preferable to processors which may run at comparable clock rates but which require multiple cycles to execute each program step to produce a slower operation.

A straight-forward bit-test approach may be used in controlling the power switch transistor 17 and may be suitable in many applications. However, it is found that such an approach with the aforementioned MicroChip processor, operating with its 1 microsecond instruction cycle, requires that the power switch transistor 17 be on for at least 2 microseconds and limits control to 2 microsecond increments. Variations of the bit-test approach have also been considered, but have been found to have similar limitations.

A specific feature of the invention relates to a program counter approach in which the values are entered into the program counter of the microprocessor 11 in a manner such as to control the duty cycle of operation of the power switch transistor 17 in small steps to obtain increased accuracy of control of charging current. An implementation of this approach is illustrated in the program sequence shown in the following Table I.

TABLE I

| ADDRESS | |
|---|---|
| 136 | Set ONTIME = 156(octal) |
| 137 | Make program counter = ONTIME |
| 138 | Turn on switch |
| 139 | Turn on switch |
| 140 | Turn on switch |
| 141 | Turn on switch |
| 142 | Turn on switch |
| 143 | Turn on switch |
| 144 | Turn on switch |
| 145 | Turn on switch |
| 146 | Turn on switch |
| 147 | Turn on switch |
| 150 | Turn on switch |
| 151 | Turn on switch |
| 152 | Turn on switch |
| 153 | Turn on switch |

TABLE I-continued

| ADDRESS | |
|---|---|
| 154 | Turn on switch |
| 155 | Turn on switch |
| 156 | Turn on switch |
| 157 | Turn off switch |
| 160 | Make program counter = complement of ONTIME |
| 161 | NOP |
| 162 | NOP |
| 163 | NOP |
| ⋮ | ⋮ |
| 217 | NOP |
| 220 | Turn off switch |
| 221 | Turn off switch |
| 222 | Turn off switch |
| 223 | Turn off switch |
| 224 | Turn off switch |
| 225 | Turn off switch |
| 226 | Turn off switch |
| 227 | Turn off switch |
| 230 | Turn off switch |
| 231 | Turn off switch |
| 232 | Turn off switch |
| 233 | Turn off switch |
| 234 | Turn off switch |
| 235 | Turn off switch |
| 236 | Turn off switch |
| 237 | Turn off switch |
| 240 | If current is too low, decrement ONTIME |
| ⋮ | If current is too high, increment ONTIME |
| ⋮ | (Housekeeping) |
| ⋮ | Make program counter = ONTIME |

In this sequence, there is a variable called ONTIME whose value indirectly determines the on-time of the switch transistor 17. The content of ONTIME is actually an address in a list of turn-on-switch instructions. Further, the program is such that the bit complement of ONTIME is an address in a list of turn-off-switch instructions. In the sequence shown in Table I, ONTIME is initially set to 156(octal). When this value is put into the program counter, the power switch transistor 17 gets turned on for 1 uS and then turned off. The complement of ONTIME is then placed in the program counter (i.e. PC=221). This causes fifteen consecutive turn-off-switch instructions to execute. The current is then examined to see if it is too low. If it is, the value in ONTIME is decreased from the initial value of 156 to 155, which will cause two turn-on-switch instructions and fourteen turn-off-switch instructions to execute on the next pass.

If at any time the current is too high, the value in ONTIME is increased, with corresponding results. For example, if the value of ONTIME is 150 to produce an on time of 7 microseconds and the current is too high, the ONTIME value is increased to 151 in the next cycle to produce an on time of 6 microseconds. If at any subsequent time, the current is too low, the value of ONTIME may be again reduced, to produce an increase in the on time of operation of the power switch transistor 17.

In the illustrated sequence, the sum of turn-on-switch instructions and turn-off-switch instructions will always equal 16. In an actual code, this has been combined with 29 microseconds of housekeeping instructions to produce a fixed period of 45 microseconds (22.2 kHz) for the switch transistor 17. The duty cycle in this illustration can vary from 0% to 33% in 1 microsecond steps.

The operability and advantages of this approach have been demonstrated by use of the microswitcher circuitry shown in FIG. 1 that takes direct wall power and charges any size nicad battery pack. An important feature is that there is no power transformer in the charge current path. The transformer 39 shown is a small and inexpensive transformer which provides low current, low voltage supplies for the charger electronics only. Thus the most expensive and hardest to source component of a switcher is eliminated, and the circuit is such that it can be isolated to avoid shock hazards through relatively simple and inexpensive mechanical interlocking.

As aforementioned, the filter capacitor 21 on the output of the power bridge circuit 18 is abnormally small. It provides electrical noise filtering only and is not intended to provide a constant DC voltage into the MOSFET switch transistor 17. Rather, this signal rises and falls with the rectified line voltage and it is left to the PWM operation to keep the charge current constant. This lack of large filter capacitors provides an additional cost savings.

As also mentioned previously, an n-channel enhancement-mode MOSFET is used as the power switch transistor 17. This is the least expensive and most widely available type power FET, but it is found that to be able to turn the device on in this configuration, it is necessary to provide a gate signal that is higher than the input line signal. This is accomplished by using the small conventional transformer 39 to create a 9 V DC source that rides on top of the line signal. The resulting signal is switched through the transistor 26, which may be a type ECG288 transistor, to control the gate of the power switch transistor 17.

It is found that providing proper base drive to the transistor 26 is important. Since its emitter is cycling from 9 V to 179 V, it is not adequate to simply pull the base low with a fixed value of resistor. This would result in either insufficient drive at low input voltages or hugely excessive currents at high input voltages. Instead, the transistor 30, which is preferably a type 2N6515 transistor, is used in a constant current configuration.

Figure 9:
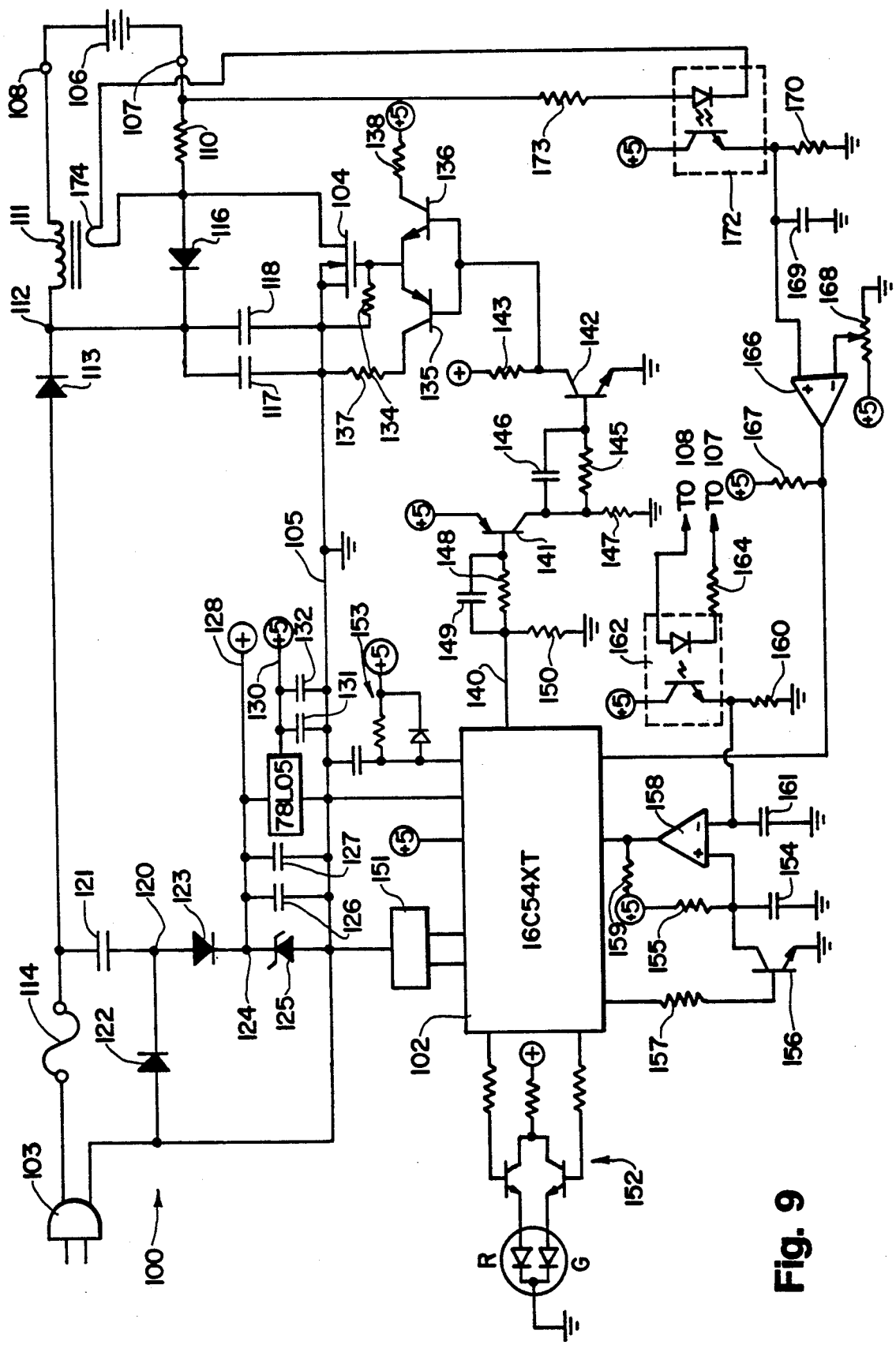
FIG. 9 is a schematic diagram similar to FIG. 1 but showing another form of battery charger constructed in accordance with the invention.

FIG. 9 is a schematic circuit diagram similar to FIG. 1 but illustrating another form of charger 100 constructed in accordance with the invention, having many of the advantageous features of the charger 10 and having additional features which further reduce manufacturing costs and provide other important advantages. The charger 100 is similar to the charger 10 in having no power transformer, but differs from the charger 10 in that it also has no transformer corresponding to the small transformer 39 of the charger 10. DC operating voltages for a microprocessor 102 and other circuits are obtained through direct rectification of an input AC supply voltage received by a plug 103. Also, the need for the bias boost circuitry of the charger 10 is obviated by tying one electrode of a switching power transistor 104 to a common ground line 105 for the microprocessor 102 and associated control circuits. A battery 106 to be charged is in floating relationship to the ground line 105 and optical isolator circuits are used for supplying current and voltage sense signals to the control circuitry of the charger 100. These and other features of the charger 100 will be clarified in the following detailed description.

As shown in FIG. 9, negative and positive terminals of the battery 106 to be charged are connected to terminals 107 and 108. The negative terminal 107 is connected through a current sense resistor 110 to the drain electrode of the switching power transistor 104, the source electrode of transistor 104 being connected to the common ground line 105. Transistor 104 may preferably be the same type of MOSFET as is preferably used as the transistor 17 of the first embodiment. The positive battery terminal 108 is connected through an inductor 111 to a circuit point 112 which forms the positive terminal of a charging current source. Circuit point 112 is connected through a rectifying diode 113 and a fuse 114 to the ungrounded terminal of plug 103, through a free wheeling or flyback diode 116 to the drain electrode of transistor 104 and through a pair of capacitors 117 and 118 to the ground line 105.

To develop DC operating voltages for the microprocessor 102 and other circuits, a circuit is provided in which a circuit point 120 is connected through a capacitor 121 and the fuse 114 to the upper terminal of plug 103, through a diode 122 to the lower terminal of plug 103 and ground line 105 and through a diode 123 to a circuit point 124 which is connected through a 12 volt zener diode 125 to the ground line 105. Circuit point 124 is also connected through filter capacitors 126 and 127 to the ground line 105, to a terminal 128 which forms a 12 volt supply terminal for certain circuits and to the input of a voltage regulator 130 which has its output connected through capacitors 131 and 132 to the ground line and also to a 5 volt supply terminal for various circuits as indicated.

The gate electrode of the switching power transistor 104 is connected through a resistor 134 to the ground line and to the emitters of PNP and NPN transistors 135 and 136, the collector of transistor 135 being connected through a resistor 137 to the ground line 105 and the collector of transistor 136 being connected through a resistor 138 to the plus 12 volt supply terminal. The bases of the transistors 135 and 136 are connected together and are supplied with a control signal developed from an output line 140 of the microprocessor 102 through two transistors 141 and 142. As shown, the bases of transistors 135 and 136 are connected through a resistor 143 to the plus 12 volt supply terminal and also to the collector of the transistor 142 which has a grounded emitter and a base connected through a resistor 145 and a parallel capacitor 146 to the collector of transistor 141 which is connected through a resistor 147 to ground. The emitter of transistor 141 is connected to the plus 5 volt supply terminal while its base is connected through a resistor 148 and capacitor 149 to the microprocessor output line 140 which is connected through a resistor 150 to ground.

The operation is similar to that described above in connection with FIG. 1, the transistors 141 and 142 together with the transistors 135 and 136 being operative to control conduction of the main power switching transistor 104 from a pulse width modulated signal developed by microprocessor 102 on line 140 thereof.

Like the circuit 10 of FIG. 1, the circuit 100 of FIG. 9 also includes a crystal/resonator 151 and indicator diode circuitry 152. Conventional power-up circuitry 153 is shown connected to a master clear input of the microprocessor 102. Voltage measuring circuitry is provided which is also similar to that to the circuit 10. A ramp generator is formed by a capacitor 154 connected to ground and through a resistor 155 to the regulated plus 5 volt supply, with a clamping transistor 156 being connected across the capacitor 154 and having its base connected through a resistor 157 to an output port or pin of the microprocessor 102 which is shifted from a high condition to a low condition at the start of a measurement operation. Transistor 156 then ceases conduction to allow the capacitor 154 to charge through the resistor 155 and to develop a ramp voltage at its ungrounded terminal. The ramp voltage so developed is applied to the plus input of a comparator 158 the output of which is connected through a resistor 159 to the plus 5 volt regulated supply voltage and directly to an input port of the microprocessor 102. The minus input of the comparator 158 is connected through a resistor 160 and a capacitor 161 to ground and is connected to an output terminal of an optoisolator circuit 162 to receive a voltage proportional to battery voltage. Optoisolator circuit is connected to the plus 5 volt supply terminal and its input is connected through a resistor 164 to the battery terminals 107 and 108. With the optoisolator circuit 162, the battery circuit, which is in "floating" relation to the circuit ground, is isolated from the processor circuitry but the voltage supplied to the minus input of comparator 158 is proportional to battery voltage and the voltage measuring operation is substantially the same as described hereinabove in connection with circuit of the charger 10 of FIG. 1.

A current sensing arrangement is provided which includes a comparator 166 which is similar to the comparator 50 of FIG. 1 and which has an output connected to an input port of the processor 102 and through a resistor 167 to the plus 5 volt supply, a minus input supplied with a reference voltage and a plus input supplied with a voltage proportional to battery current.

As shown, the minus input of the comparator 166 is supplied with a manually adjustable reference voltage from a contact of a potentiometer 168 which is connected between ground and the plus 5 volt supply terminal. If desired an arrangement such as shown in FIG. 1 and including the resistors 52-57 may be substituted for the potentiometer 168 to allow programmed adjustment of the reference voltage applied to the minus input of comparator 166.

The plus input of comparator 166 is connected to ground through a capacitor 169 and a resistor 170 and is connected to optoisolator circuit 172 which is connected to the plus 5 volt supply terminal. The optoisolator circuit 172 has one input terminal connected through a resistor 173 to the battery terminal 107 and one end of the current sense resistor 110 and a second input terminal connected to the other end of the current sense resistor 110 through a winding 174 which is inductively coupled to the inductor 111. The voltage across resistor 110 is proportional to battery current. Winding 174 is provided for the purpose of adding to the voltage across resistor 110 a biasing voltage which is sufficient to insure that the output from the optoisolator circuit 172 is proportional to battery current. It was provided after finding that sufficient radiation from the LED of the optoisolator circuit was not obtained from the current sense resistor 110 alone. Winding 174 may simply be a wire extending through a torroidal core of the inductor 112.

In summary, the invention provides voltage measurement circuitry which is quite simple and inexpensive but which reduces the effects of variations in supply voltage and which provides highly accurate and reliable operation for detection of the full charge condition of a battery, particularly when using features of microprocessor control to obviate the effects of false peak conditions, noise, variations in contact resistance and other deleterious effects. A microswitcher circuit configuration is provided which is quite inexpensive to manufacture and yet can supply very high and accurately controlled currents to rapidly charge batteries to a maximum charge condition without overcharging. It will be understood the voltage measurement circuit and features of control thereof are usable in other applications and that the microswitcher approach is not limited to use in the circuit configuration as specifically illustrated but can also be used in up-converter and isolated switcher configurations and thereby embrace a great many charger and other applications.

It will be also be understood that modifications and variations may be effected without departing from the spirit and scope of the novel concepts of this invention

What is claimed is:

1. A battery charger for connection to an AC supply of a type provided by a conventional wall outlet, AC supply terminals for connection to said AC supply, battery terminals for connection to a battery, power supply means connected to said AC supply terminals and said battery terminals. for supply of charging current to said battery, and processor means for supply of control signals to said power supply means, voltage sensing means coupled to said battery terminals and to said processor means for monitoring of battery voltage by said processor means, said processor means being operative for performing control functions including determining a full charge condition of said battery through said monitoring of said battery voltage and including control of one of said control signals to said power supply means to terminate application of said charging current upon said determining of said full charge condition of said battery, said processor means in said determining of said full charge condition being operative to detect a peak value of said battery voltage and to thereafter respond to a drop of more than a threshold value below said peak value, and said processor means being operative to avoid said termination of said application of charging current when said detection of said peak value of said battery voltage is followed immediately by a concave upward profile of said battery voltage versus time.

2. A battery charger for connection to an AC supply of a type provided by a conventional wall outlet, AC supply terminals for connection to said supply, battery terminals for connection to a battery, power supply means connected to said AC supply terminals and said battery terminals for supply of charging current to said battery, and processor means for supply of control signals to said power supply means, voltage sensing means coupled to said battery terminals and to said processor means for monitoring of battery voltage by said processor means, said processor means being operative for performing control functions including determining a full charge condition of said battery through said monitoring of said battery voltage and including control of one of said control signals to said power supply means to terminate application of said charging current upon said determining of said full charge condition of said battery, and said processor means in said monitoring of said battery, and said processor means in said monitoring of said battery voltage being operative to periodically measure said battery voltage through taking of a reading of a present value of said battery voltage and determining a running value of said battery voltage in accordance with an exponential averaging function, wherein in each said determining of said running value of said battery voltage a fraction of said running value is removed and replaced by a fraction of said reading of said present value of said battery voltage.

3. A battery charger for connection to an AC supply of a type provided by a conventional wall outlet, AC supply terminals for connection to said supply, battery terminals for connection to a battery, power supply means connected to said AC supply terminals and said battery terminals for supply of charging current to said battery, and processor means for supply of control signals to said power supply means, voltage sensing means coupled to said battery terminals and to said processor means for monitoring of battery voltage by said processor means, said processor means being operative for performing control functions including determining a full charge condition of said battery through said monitoring of said battery voltage and including control of one of said control signals to said power supply means to terminate application of said charging current upon said determining of said full charge condition of said battery, and said processor means in said monitoring of said battery voltage being able to take periodic measurements of said battery voltage and to control one of said control signals applied to said power supply means to discontinue application of said charging current at times during said periodic measurements.

4. A battery charger for connection to an AC supply of a type provided by a conventional wall outlet, AC supply terminals for connection to said supply, battery terminals for connection to a battery, power supply means connected to said AC supply terminals and said battery terminals for supply of charging current to said battery, and processor means for supply of control signals to said power supply means, said charger including battery temperature sensing means coupled to said processor means for developing and applying a voltage to said processor means, said processor means being operative to periodically measure said voltage applied from said battery temperature sensing means and to control one of said control signals applied to said power supply means to stop application of said charging current in response to an excessive time rate of change of said voltage applied from said temperature sensing means.

5. A battery charger for connection to an AC supply of a type provided by a conventional wall outlet, AC supply terminals for connection to said supply, battery terminals for connection to a battery, power supply means connected to said AC supply terminals and said battery terminals for supply of charging current to said battery, and processor means for responding to a control voltage to control supply of a control signal to said power supply means, said charger including control voltage supplying means for supplying said control voltage to said processor means, ramp voltage generating means for generating a ramp voltage beginning at a starting time and changing in proportion to elapsed time from said starting time, voltage comparator means for developing an output signal in response to a comparison of said control voltage developed by said control voltage supplying means and said ramp voltage developed by said ramp voltage generating means, said processor means being connected to said ramp voltage generating means for initiating said generating of said ramp voltage by said ramp voltage generating means and being operative for measuring a time period between said initiating of said generating of said ramp voltage by said ramp voltage generating means and said developing of said output signal by said voltage comparator means.

6. A battery charger as defined in claim 5, said control voltage supply means being coupled to said battery terminals and being operative to supply said control voltage as a voltage proportional to battery voltage.

7. A battery charger as defined in claim 6, said processor means being operative through measurement of time since said initiating said generating of said ramp voltage by said ramp voltage generating means to anticipate said developing of said output signal by said voltage comparator means during each generation of said ramp voltage and being operative to control supply of said control signal to said power supply means to discontinue application of said charging current for only a short time interval starting shortly before said developing of said output signal.

8. A battery charger for connection to an AC supply of a type provided by a conventional wall outlet, AC supply terminals for connection to said supply, battery terminals for connection to a battery, switching power supply means connected to said AC supply terminals and said battery terminals for supply of charging current to said battery, and processor means for supply of a switching signal to said switching power supply means for control of said charging current, current sensing means for sensing battery current, said processor means being coupled to said current sensing means and being operative to supply said switching signal to said switching power supply means as a pulse width modulated switching signal having a duty cycle controlling said charging current, said processor means including a microprocessor programmed for control of said duty cycle of said pulse-width modulated switching signal.

9. A battery charger as defined in claim 8, said microprocessor being programmed to operate with program counter values which are so entered as to control said duty cycle of said pulse-width modulated signals in small steps corresponding to an instruction cycle time of operation of said microprocessor.

10. A battery charger as defined in claim 10, said switching power supply means being connected to provide a direct conductive non-isolated path from said AC supply terminals to said battery terminals for direct transformer-less supply of charging current to said battery.

11. A battery charger for connection to an AC supply of a type provided by a conventional wall outlet, a pair of AC supply terminals for connection to said AC supply, battery terminals for connection to a battery, switching power supply means connected to provide a direct conductive non-isolated path from said AC supply terminals to said battery terminals for direct transformer-less supply of charging current to said battery, and processor means for supply of switching signals to said switching power supply means and for performing control functions including terminating application of said charging current upon reaching a full charge condition of said battery connected to said battery terminals, said switching power supply including a rectifier section having an input connected to said pair of AC supply terminals and having a pair of output terminals for supplying a rectified DC voltage, and power transistor means coupled in series relation between said pair of output terminals of said rectifier section and said pair of battery terminals, processor voltage supply means for supplying an operating voltage for said processor means, and means providing common circuit ground connections to said processor voltage supply means, to said processor means and to one of said pair of output terminals of said rectifier section, said switching power supply further including an output section having an output coupled to said battery terminals and an input coupled through said power transistor means to said pair of output terminals of said rectifier section, said output section including inductor means coupled between said input of said output section and said output of said output section and diode means coupled in shunt relation to said input of said output section for conduction of current through said inductor means and the battery during periods of non-conduction of said power transistor means.

12. A battery charger as defined in claim 11, wherein said rectifier section includes diode means, means connecting said one of said pair of output terminals of said rectifier section to one of said pair of AC supply terminals, and means connecting said diode means between the other of said pair of output terminals of said rectifier section and the other of said pair of AC supply terminals, said processor voltage supply means supplying said operating voltage for said processor means through a direct conductive non-isolated path from said AC supply terminals.

13. A battery charger as defined in claim 13, wherein said rectifier section includes diode means operative as a full-wave bridge rectifier, said processor voltage supply means including rectifier means, transformer means having primary and secondary winding means, means coupling said primary winding means to said AC supply terminals, and means coupling said rectifier means of said processor voltage supply means to said secondary winding means for developing said operating voltage for said processor means.

14. A battery charger as defined in claim 13, said rectifier means of said processor voltage supply means being also operative for supplying a biasing voltage for operation of said power transistor means.

15. A battery charger as defined in claim 14, said secondary winding means including first and second windings, and said rectifier means of said processor voltage supply means including a first rectifier for supply of said operating voltage for said processor means a second rectifier for supply of said biasing voltage for operation of said power transistor means.

16. A battery charger comprising battery terminals for connection to a battery, power supply means connected to said battery terminals for supply of a charging current to said battery, battery voltage sensing means connected to said battery terminals for developing a control voltage proportional to battery voltage, ramp voltage generator means for generating a ramp voltage beginning at a starting time and changing in proportion to elapsed time since said starting time, voltage comparator means for comparing said control voltage developed by said battery voltage sensing means and said ramp voltage generated by said ramp voltage generator means to develop an output signal, and microprocessor means connected to said ramp voltage generator means for initiating said generating of said ramp voltage and connected to said comparator means for reception of said output signal, said microprocessor means being operative for measuring a time period from said initiating of said generating of said ramp voltage by said ramp voltage generator means to said reception of said output signal from said voltage comparator means and for developing and applying a current control signal to said power supply means for control of said charging current supplied to said battery as a function of said time period.

17. A battery charger as defined in claim 16, including voltage supply means for supplying an operating voltage for said microprocessor means, and second voltage comparator means for comparing said operating voltage supplied by said voltage supply means and said ramp voltage generated by said generator means to develop a second output signal, said microprocessor means being operative for measuring a second time period from said initiating of said generating of said ramp voltage by said ramp voltage generator means to development of said second output signal by said second voltage comparator means and for modifying said current control signal as a function of said second time period.

18. A battery charger as defined in claim 21, wherein said voltage supply means includes voltage regulator means for applying a regulated voltage to said second voltage comparator means for comparison with said ramp voltage generator by said ramp generator means.

19. A battery charger as defined in claim 18, wherein said regulated voltage is supplied to said ramp generator means for operation thereof.

20. A battery charger as defined in claim 19, wherein said regulated voltage is also supplied to said microprocessor means for operation thereof.

21. A battery charger as defined in claim 16, wherein said battery voltage sensing means includes capacitor means for minimizing noise in said control voltage.

22. A battery charger as defined in claim 20, said ramp generator means comprising capacitor means across which said ramp voltage is developed, transistor means coupled in circuit with said capacitor means and controlled by said microprocessor means for fixing the level of charge of said capacitor means prior to said initiating of said generating of said ramp voltage and for thereafter allowing development of said ramp voltage.

23. A battery charger as defined in claim 10, said switching power supply including a rectifier section having an input connected to said pair of AC supply terminals and having a pair of output terminals for supplying a rectified DC voltage, and power transistor means coupled in series relation between said pair of output terminals of said rectifier section and said pair of battery terminals, processor voltage supply means for supplying an operating voltage for said processor means, and means providing common circuit ground connections to said voltage supply means, to said processor means and to one of said pair of output terminals of said rectifier section.

24. A battery charger as defined in claim 10, wherein said switching power supply means includes a rectifier section having an input connected to said pair of Ac supply terminals and having a pair of output terminals for supplying a rectified DC voltage, and power transistor means coupled in series relation between said pair of output terminals of said rectifier section and said pair of battery terminals, processor voltage supply means for supplying an operating voltage for said processor means, and wherein said switching power supply means further includes an output section having an output coupled to said battery terminals and an input coupled through said power transistor means to said pair of output terminals of said rectifier section, said output section including inductor means coupled between said input of said output section and said output of said output section and diode means coupled in shunt relation to said input of said output section for conduction of current through said inductor means and the battery during periods of non-conduction of said power transistor means.

25. A battery charger as defined in claim 12, said power transistor means being coupled between said input of said output section and said one of said pair of output terminals of said rectifier section, and means including isolation circuit means between said battery terminals and said processor means for monitoring of battery voltage by said processor means to determine said full charge condition of said battery.

26. A battery charger as defined in claim 25, said output section including a current sensing resistor connected to one of said pair of battery terminals and connected through said power transistor means to said one of said output terminals of said rectifier means, and second isolation circuit means coupled between said current sensing resistor and said processor means for monitoring of current by said processor means.

27. A battery charger as defined in claim 11, said power transistor means being an n-channel enhancement-mode MOSFET transistor.

* * * * *